United States Patent [19]

Mukai et al.

[11] 4,184,190

[45] Jan. 15, 1980

[54] ELECTRICAL CAPACITOR

[76] Inventors: Sadayoshi Mukai; Yoshiaki Otani; Osamu Yamaguchi, all of c/o Nissin Electric Co., Ltd., 47, Umezu Takase-cho,, Ukyo-ku, Kyoto, Japan

[21] Appl. No.: 904,265

[22] Filed: May 9, 1978

[30] Foreign Application Priority Data

May 16, 1977 [JP] Japan .................................. 52/56768

[51] Int. Cl.$^2$ ............................................. H01G 4/22
[52] U.S. Cl. ..................................... 361/315; 361/318; 361/319; 361/327; 252/63
[58] Field of Search ............... 361/315, 318, 319, 327; 252/63

[56] References Cited

U.S. PATENT DOCUMENTS

| 1,667,214 | 4/1928 | Michel | 252/63 |
| 1,878,509 | 9/1932 | Michel | 252/63 |
| 3,812,407 | 5/1974 | Nose | 361/315 |
| 3,833,978 | 9/1974 | Eustance | 361/315 X |
| 4,053,941 | 10/1977 | Shimizu | 361/319 |
| 4,054,937 | 10/1977 | Mandelcorn | 361/315 X |

FOREIGN PATENT DOCUMENTS 7425116  5/1974  France ...................................... 361/315

Primary Examiner—Richard R. Kucia
Attorney, Agent, or Firm—Christensen, O'Connor, Johnson & Kindness

[57] ABSTRACT

An electrical capacitor using as the insulating oil a mixture of triaryl phosphate, diisopropyl naphthalene and monoisopropyl naphthalene. The phosphate has the structural formula of

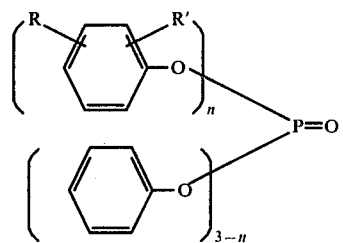

wherein n=1 to 3; R and R' are alkyl groups, the number of R being 1 and the number of R' being 0 or 1, and the total number of carbon atoms contained in the alkyl group or groups attached to each benzene ring is 1 to 5.

8 Claims, 3 Drawing Figures

ELECTRICAL CAPACITOR

This invention relates to an electrical capacitor and more particularly to an oil-filled or oil-immersed electrical capacitor.

Mineral oil is the commonest of the various kinds of insulating oil used in oil-immersed capacitor. Mineral oil, however, is combustible and likely to burn to cause a fire while the capacitor is in use.

To solve the problem, polychlorinated biphenyl has been used as the insulating oil. Polychlorinated biphenyl is incombustible so that there is no danger of fire at all. It has been found, however, polychlorinated biphenyl is stored in life so as to cause so much harm to it that the use of this compound is now strictly limited. The use of polychlorinated biphenyl in electrical devices is also limited.

There exists a strong and pressing demand for an insulating oil which is incombustible and can effectively be used in oil-immersed electrical capacitors in place of polychlorinated biphenyl.

In addition to being incombustible, the insulating oil to be used in oil-immersed electrical capacitors must have characteristics suitable for use in such capacitors, such as a high corona starting voltage and a high long time withstand AC voltage. To meet the requirements the insulating oil must have a low dielectric loss tangent (tan δ) and preferably the evaporated amount of the oil is as little as possible. If plastic film is used in the capacitor element, it is preferable that the insulating oil has as high an ability as possible to penetrate through the plastic film.

Accordingly, the primary object of the invention is to provide an electrical capacitor which is impregnated with an insulating oil which is incombustible and harmless to life.

Another object of the invention is to provide such an electrical capacitor as aforesaid which is incombustible and has good characteristics as a capacitor.

Another object of the invention is to provide such an electrical capacitor as aforesaid which is incombustible, compact in size and capable of withstanding high voltage.

Still another object of the invention is to provide such an electrical capacitor as aforesaid which is incombustible and has a high corona starting voltage as well as a high long time withstand AC voltage.

A further object of the invention is to provide an electrical capacitor which employs plastic film as the dielectric material and which is incombustible and has good characteristics as an electrical capacitor.

The insulating oil used in the capacitor of the invention is a mixture of at least one kind of triaryl phosphate, an insulating oil the principal component of which is diisopropyl naphthalene (which will be referred to as DIPN hereinafter) and an insulating oil the principal component of which is monoisopropyl naphthalene (which will be referred to as MIPN hereinafter). The capacitor element of the capacitor of the invention is impregnated with the mixed oil.

Triaryl phosphate is expressed by the structural formula of

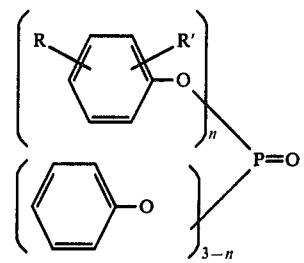

wherein $n = 1$ to 3; R and R' are alkyl groups, the number of R being 1 and the number of R' being 0 or 1; and the total number of the carbon atoms contained in the alkyl group or groups attached to each benzene ring is 1 to 5.

Examples of triaryl phosphate to be used are tricresyl phosphate (which will be referred to as TCP), trixylenyl phosphate (which will be referred to as TXP), triisopropylphenyl phosphate (which will be referred to as PPP), triethylphenyl phosphate (which will be referred to as EPP) and phenyl-diisopropylphenyl phosphate (which will be referred to as PDP). These compounds may be used individually or in combination of two or more of them.

The structural formulae of the above phosphates are as follows:

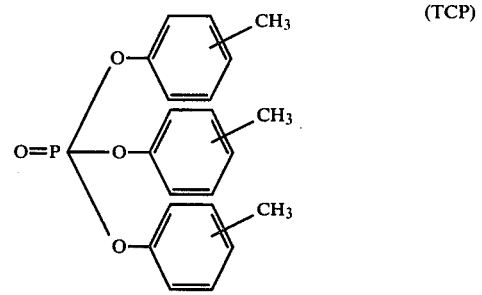

(TCP)

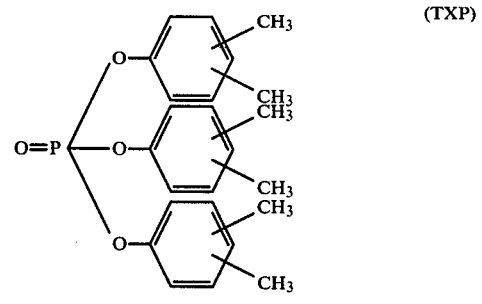

(TXP)

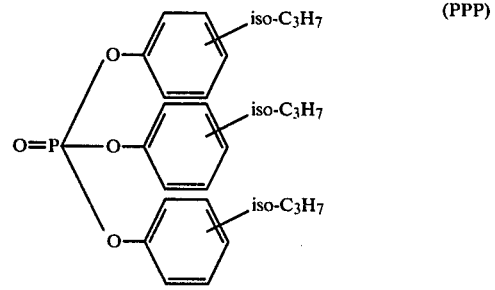

(PPP)

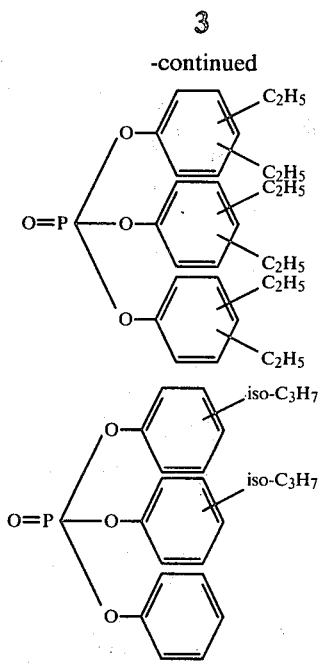

In triaryl phosphate, as the number of the alkyl groups attached to each benzene ring or the number of the carbon atoms included in the alkyl groups increase, the viscosity of the phosphate increases. High viscosity is an undesirable property which makes the phosphate unsuitable for use as insulating oil.

DIPN and MIPN usually contain impurities such as by-products produced in the synthesizing process of the oils. Although DIPN and MIPN preferably are as pure as possible, complete removal of such impurities would unreasonably increase the production cost. From the practical point of view such impurities do not affect the characteristics of the insulating oil and the capacitor provided that they are contained in small amount.

As will be seen from the examples to be described later, the mixing ratio of triaryl phosphate, DIPN and MIPN is preferably such that the phosphate is 50% to 80% by weight, DIPN is 5% to 50% by weight and MIPN is over 0% to 15% by weight, the total amount of these components being 100% by weight.

The invention will be described in detail with reference to the accompanying drawings, wherein.

TABLES 1 to 4 show various characteristics of triaryl phosphates, DIPN and MIPN individually as well as those of the mixture thereof in different mixing ratios. In TABLE 3 the symbol (PPP+PDP) indicates a triaryl phosphate which is commercially available under the tradename "Reophos 110" produced by AJINOMOTO CO. Ltd., Tokyo, Japan and comprises a mixture of the previously mentioned PPP and PDP.

Figure 1:
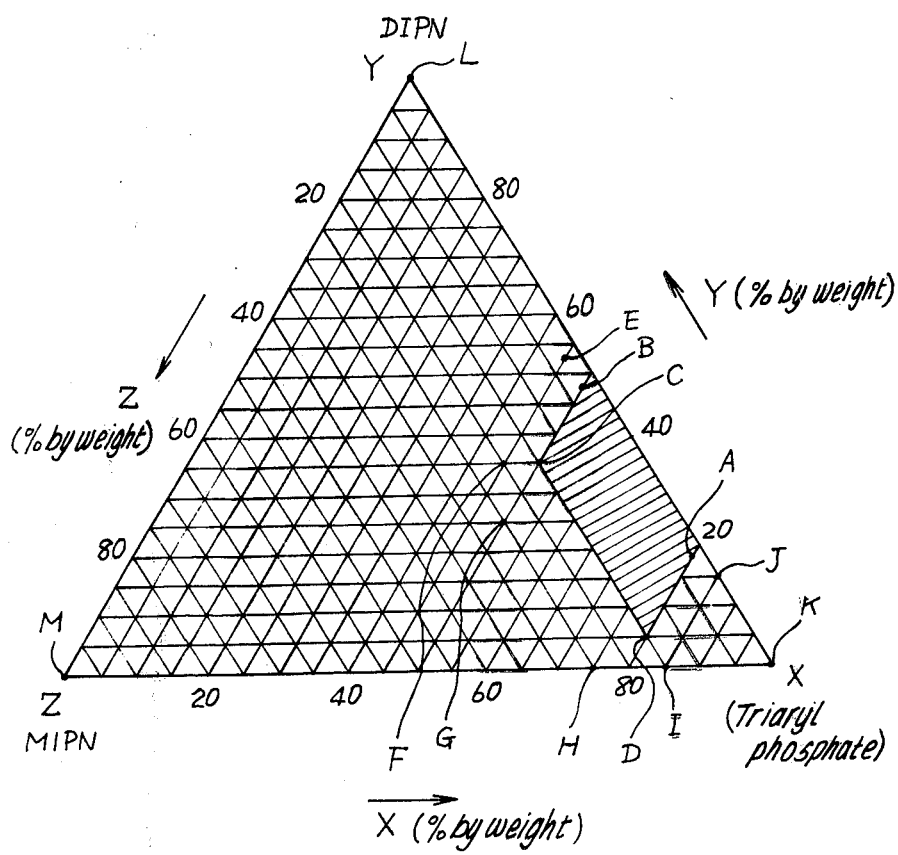
FIG. 1 is a ternary diagram for explanation of the mixing ratio of the components of the mixed oil used in the capacitor of the invention.

The alphabetic letters A to M in TABLES 1 to 4 indicate the mixed oils in different mixing ratios, and the alphabetic letters in the diagram of FIG. 1 correspond to the same letters in TABLES 1 to 4.

TABLES 5 to 8 show the corona starting voltage (which will be referred to CSV) at 25° C., the long time withstand AV voltage after $10^5$ seconds at 25° C. and the combustion time of capacitors having capacitor elements I, II and III, respectively, which have been put in a casing, heated and dried under vacuum and then impregnated with the mixed oil in different mixing ratios.

The capacitor element I comprises five sheets of insulating paper alone as the dielectric material; the capacitor element II comprises a single sheet of insulating paper sandwiched between a pair of sheets of plastic film as the dielectric; and the capacitor element III comprises three sheets of plastic film alone as the dielectric.

The materials and dimensions of the insulating paper, the plastic film and the electrodes are given below.

|  |  |  | Thickness ($\mu$) | Width (cm) | Length (m) | Density (g/cm$^3$) |
|---|---|---|---|---|---|---|
| Dielectric material | Insulating paper | Paper for capacitor | 18 | 28 | 4 | 0.8 |
| Electrode foil | Plastic film | Polypropylene | 18 | 28 | 4 | — |
|  |  | Aluminium | 10 | 25 | 3 | — |

Figure 2:
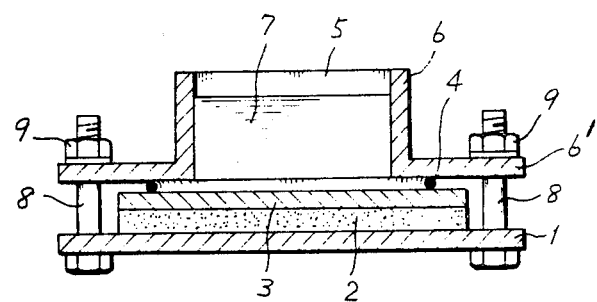
FIG. 2 is a schematic sectional view of a device for measuring the amount of the mixed oil that penetrates through plastic film used in the invention.
Figure 3:
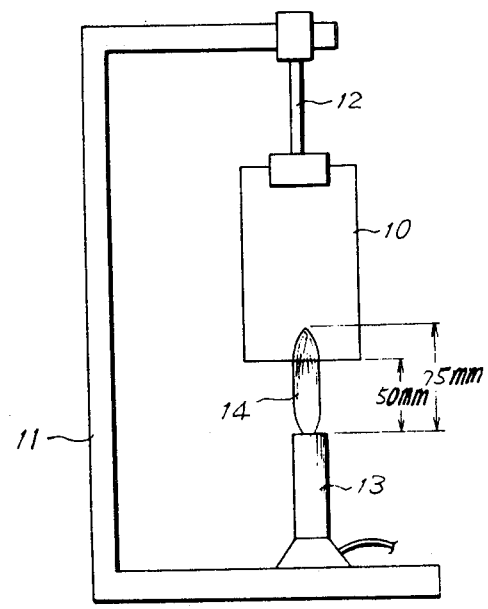
FIG. 3 is a schematic side view of a device for measuring the combustion time of the capacitor element used in the capacitor of the invention.

The penetrating amount given in TABLES 1 to 4 and to be referred to below is a measure by which the characteristic of the plastic film to permit penetration of the mixed oil therethrough is known. The measurement of the penetrating amount may be conducted by a device as shown in FIG. 2. The device comprises a base 1 on which a sheet 3 of 18$\mu$ thick biaxially oriented polypropylene film to be tested is supported with a sheet 2 of filter paper interposed therebetween, and a hollow cylindrical member 6 having a lower flange 6' secured by means of bolts 8 and nuts 9 to the base 1, with an O-ring seal 4 interposed between the polypropylene film sheet 3 and the flange 6', so as to form a vessel 5 with the film sheet 3 as its bottom. The vessel 5 is then filled with mixed oil 7 and placed in an oven (not shown) kept at 80° C. for a predetermined number of days. Upon lapse of the days the vessel is taken out of the oven to measure the amount of the mixed oil that has penetrated through the plastic film and absorbed by the filter paper 2.

In TABLES 1 to 8, the method of measuring the combustion time or combustibility of the capacitor elements and the criteria for judgment of the results of the measurement are as follows.

The casing of the capacitor to be tested is opened to take out therefrom the capacitor element impregnated with the insulating oil. After drops of the oil have been removed from the capacitor element 10, it is held by a holder 12 mounted on a stand 11, and a gas burner 13 is positioned 50 mm below the element 10 and adjusted to produce a blue flame 14 having a height of 75 mm. After the flame has been applied to the element for one minute, the burner is removed from under the element 10 and the time the element continues to burn is measured. If the burning stops within 10 seconds after removal of the burner, the capacitor element or the oil with which the element is impregnated is considered "incombustible" or "self-extingushing", and when the burning continues for more than 10 seconds, the capacitor element or the oil is considered "combustible".

TABLE 1

| Symbol | Kind of mixed oil (% by weight) | | | Specific gravity (at 20° C.) | Refractive index (at 20° C.) | Flash Point (°C.) | ε (at 80° C.) (at 60 Hz) |
|---|---|---|---|---|---|---|---|
| | TXP | DIPN | MIPN | | | | |
| A | 80 | 18 | 2 | 1.087 | 1.555 | 195 | 5.3 |
| B | 50 | 48 | 2 | 1.037 | 1.559 | 180 | 4.2 |
| C | 50 | 35 | 15 | 1.039 | 1.560 | 175 | 4.3 |
| D | 80 | 5 | 15 | 1.090 | 1.554 | 190 | 5.3 |
| E | 45 | 53 | 2 | 1.029 | 1.560 | 175 | 4.0 |
| F | 45 | 35 | 20 | 1.032 | 1.561 | 150 | 4.0 |
| G | 50 | 25 | 25 | 1.041 | 1.560 | 170 | 4.3 |
| H | 75 | 0 | 25 | 1.069 | 1.559 | 180 | 5.2 |
| I | 85 | 0 | 15 | 1.098 | 1.556 | 195 | 5.5 |
| J | 85 | 15 | 0 | 1.094 | 1.555 | 200 | 5.5 |
| K | 100 | 0 | 0 | 1.120 | 1.553 | 215 | 6.0 |
| L | 0 | 100 | 0 | 0.953 | 1.565 | 145 | 2.5 |
| M | 0 | 0 | 100 | 0.975 | 1.576 | 120 | 2.5 |

TABLE 1-continued

| Symbol | Combustion time (Second) Capacitor element "II" | | tan δ (%) (at 80° C.) | | Penetrating amount (g/m²/day) | | Evaporated amount (at 95° C., 5 hours) | | Total evaluation |
|---|---|---|---|---|---|---|---|---|---|
| A | 0 | ○ | 0.9 | ○ | 2.1 | ○ | 0.11 | ○ | ○ |
| B | 6 | ○ | 0.6 | ○ | 4.2 | ○ | 0.11 | ○ | ○ |
| C | 6 | ○ | 0.7 | ○ | 4.7 | ○ | 0.18 | ○ | ○ |
| D | 0 | ○ | 1.0 | ○ | 2.3 | ○ | 0.17 | ○ | ○ |
| E | 15 | X | 0.5 | ○ | 4.2 | ○ | 0.11 | ○ | X |
| F | 17 | X | 0.8 | ○ | 4.6 | ○ | 0.30 | X | X |
| G | 7 | ○ | 0.7 | ○ | 4.9 | ○ | 0.41 | X | X |
| H | 0 | ○ | 0.9 | ○ | 2.3 | ○ | 0.42 | X | X |
| I | 0 | ○ | 2.1 | X | 1.8 | X | 0.20 | ○ | X |
| J | 0 | ○ | 2.3 | X | 1.0 | X | 0.10 | ○ | X |
| K | 0 | ○ | 20.1 | X | 0.2 | X | 0.10 | ○ | X |
| L | >60 | X | 0.01 | ○ | 6.7 | ○ | 0.10 | ○ | X |
| M | >60 | X | 0.01 | ○ | 8.5 | ○ | 0.60 | X | X |

TABLE 2

| Symbol | Kind of mixed oil (% by weight) | | | Specific gravity (at 20° C.) | Refractive index (at 20° C.) | Flash point (°C.) | ε (at 80° C.) (at 60 Hz) |
|---|---|---|---|---|---|---|---|
| | TCP | DIPN | MIPN | | | | |
| A | 80 | 18 | 2 | 1.127 | 1.559 | 195 | 5.4 |
| B | 50 | 48 | 2 | 1.062 | 1.561 | 180 | 4.3 |
| C | 50 | 35 | 15 | 1.063 | 1.561 | 175 | 4.4 |
| D | 80 | 5 | 15 | 1.129 | 1.560 | 190 | 5.4 |
| E | 45 | 53 | 2 | 1.051 | 1.562 | 175 | 4.3 |
| F | 45 | 35 | 20 | 1.055 | 1.564 | 150 | 4.4 |
| G | 50 | 25 | 25 | 1.065 | 1.563 | 170 | 4.4 |
| H | 75 | 0 | 25 | 1.102 | 1.562 | 180 | 5.3 |
| I | 85 | 0 | 15 | 1.140 | 1.560 | 195 | 5.6 |
| J | 85 | 15 | 0 | 1.137 | 1.558 | 200 | 5.6 |
| K | 100 | 0 | 0 | 1.170 | 1.557 | 210 | 6.4 |

| Symbol | Combustion time (second) Capacitor element "II" | | tan δ (%) (at 80° C.) | | Penetrating amount (g/m²/day) | | Evaporated Amount (at 95° C., 5 hours) | | Total evaluation |
|---|---|---|---|---|---|---|---|---|---|
| A | 0 | ○ | 0.9 | ○ | 2.1 | ○ | 0.10 | ○ | ○ |
| B | 7 | ○ | 0.7 | ○ | 3.9 | ○ | 0.12 | ○ | ○ |
| C | 7 | ○ | 0.6 | ○ | 4.1 | ○ | 0.18 | ○ | ○ |
| D | 0 | ○ | 0.9 | ○ | 2.1 | ○ | 0.17 | ○ | ○ |
| E | 20 | X | 0.7 | ○ | 4.2 | ○ | 0.17 | ○ | X |
| F | 17 | X | 0.8 | ○ | 4.7 | ○ | 0.38 | X | X |
| G | 6 | ○ | 0.5 | ○ | 4.0 | ○ | 0.41 | X | X |
| H | 0 | ○ | 1.0 | ○ | 2.3 | ○ | 0.42 | X | X |
| I | 0 | ○ | 1.7 | X | 1.5 | X | 0.23 | X | X |
| J | 0 | ○ | 1.9 | X | 1.0 | X | 0.18 | ○ | X |
| K | 0 | ○ | 10.3 | X | 0.4 | X | 0.15 | ○ | X |

TABLE 3

| Symbol | Kind of mixed oil (% by weight) | | | Specific gravity (at 20° C.) | Refractive index (at 20° C.) | Flash point (°C.) | ε (at 80° C.) (at 60 Hz) |
|---|---|---|---|---|---|---|---|
| | PPP & PDP | DIPN | MIPN | | | | |
| A | 80 | 18 | 2 | 1.100 | 1.549 | 195 | 4.7 |
| B | 50 | 48 | 2 | 1.044 | 1.555 | 180 | 3.8 |
| C | 50 | 35 | 15 | 1.045 | 1.556 | 175 | 3.8 |
| D | 80 | 5 | 15 | 1.100 | 1.561 | 195 | 4.7 |
| E | 45 | 53 | 2 | 1.035 | 1.556 | 175 | 3.7 |
| F | 45 | 35 | 20 | 1.037 | 1.558 | 150 | 3.7 |
| G | 50 | 25 | 25 | 1.045 | 1.559 | 170 | 3.8 |
| H | 75 | 0 | 25 | 1.094 | 1.553 | 180 | 4.6 |
| I | 85 | 0 | 15 | 1.112 | 1.550 | 195 | 4.9 |
| J | 85 | 15 | 0 | 1.102 | 1.548 | 200 | 4.9 |
| K | 100 | 0 | 0 | 1.133 | 1.545 | 215 | 5.6 |

| Symbol | Combustion time (second) Capacitor element "II" | | tan δ (%) (at 80° C.) | | Penetrating amount (g/m²/day) | | Evaporated amount (at 95° C., 5 hours) | | Total evaluation |
|---|---|---|---|---|---|---|---|---|---|
| A | 0 | ○ | 0.9 | ○ | 2.2 | ○ | 0.10 | ○ | ○ |

TABLE 3-continued

| | | | | | | | | | | |
|---|---|---|---|---|---|---|---|---|---|---|
| B | 8 | ○ | 0.6 | ○ | 3.9 | ○ | 0.10 | ○ | ○ | |
| C | 7 | ○ | 0.9 | ○ | 3.5 | ○ | 0.16 | ○ | ○ | |
| D | 0 | ○ | 1.0 | ○ | 2.1 | ○ | 0.17 | ○ | ○ | |
| E | 18 | X | 0.7 | ○ | 4.2 | ○ | 0.11 | ○ | X | |
| F | 17 | X | 1.0 | ○ | 4.7 | ○ | 0.32 | X | X | |
| G | 5 | ○ | 0.7 | ○ | 4.0 | ○ | 0.41 | X | X | |
| H | 0 | ○ | 0.9 | ○ | 2.3 | ○ | 0.40 | X | X | |
| I | 0 | ○ | 2.1 | X | 1.3 | X | 0.21 | X | X | |
| J | 0 | ○ | 2.0 | X | 1.0 | X | 0.11 | ○ | X | |
| K | 0 | ○ | 12.5 | X | 0.2 | X | 0.09 | ○ | X | |

TABLE 4

| Symbol | Kind of mixed oil (% by weight) | | | Specific gravity (at 20° C.) | Refractive index (at 20° C.) | Flash point (°C.) | $\epsilon$ (at 80° C.) (at 60 Hz) |
|---|---|---|---|---|---|---|---|
| | EPP | DIPN | MIPN | | | | |
| A | 80 | 18 | 2 | 1.102 | 1.564 | 195 | 5.3 |
| B | 50 | 48 | 2 | 1.043 | 1.564 | 180 | 4.2 |
| C | 50 | 35 | 15 | 1.045 | 1.565 | 175 | 4.2 |
| D | 80 | 5 | 15 | 1.105 | 1.565 | 195 | 5.3 |
| E | 45 | 53 | 2 | 1.037 | 1.564 | 175 | 4.0 |
| F | 45 | 35 | 20 | 1.038 | 1.566 | 150 | 4.0 |
| G | 50 | 25 | 25 | 1.046 | 1.566 | 170 | 4.3 |
| H | 75 | 0 | 25 | 1.096 | 1.566 | 180 | 5.2 |
| I | 85 | 0 | 15 | 1.113 | 1.565 | 195 | 5.5 |
| J | 85 | 15 | 0 | 1.108 | 1.563 | 200 | 5.5 |
| K | 100 | 0 | 0 | 1.137 | 1.563 | 210 | 6.3 |

| Symbol | Combustion time (second) Capacitor element "II" | | tan δ (%) (at 80° C.) | | Penetrating amount (g/m²/day) | | Evaporated amount (at 95° C., 5 hours) | | Total evaluation |
|---|---|---|---|---|---|---|---|---|---|
| A | 0 | ○ | 0.9 | ○ | 2.1 | ○ | 0.10 | ○ | ○ |
| B | 8 | ○ | 0.6 | ○ | 3.9 | ○ | 0.11 | ○ | ○ |
| C | 9 | ○ | 0.7 | ○ | 3.7 | ○ | 0.16 | ○ | ○ |
| D | 0 | ○ | 0.7 | ○ | 2.2 | ○ | 0.17 | ○ | ○ |
| E | 20 | X | 0.5 | ○ | 4.2 | ○ | 0.11 | ○ | X |
| F | 19 | X | 0.5 | ○ | 4.7 | ○ | 0.32 | X | X |
| G | 8 | ○ | 0.6 | ○ | 4.0 | ○ | 0.41 | X | X |
| H | 0 | ○ | 0.9 | ○ | 2.3 | ○ | 0.40 | X | X |
| I | 0 | ○ | 1.9 | X | 1.5 | X | 0.18 | ○ | X |
| J | 0 | ○ | 1.8 | X | 1.0 | X | 0.10 | ○ | X |
| K | 0 | ○ | 13.7 | X | 0.4 | X | 0.10 | ○ | X |

TABLE 5

| Kind of mixed oil (Symbol in TABLE 1) | Capacitor element "I" | | | Capacitor element "II" | | | Capacitor element "III" | | |
|---|---|---|---|---|---|---|---|---|---|
| | CSV (V/μ) | ACL (V/μ) | Combustion time (second) | CSV (V/μ) | ACL (V/μ) | Combustion time (second) | CSV (V/μ) | ACL (V/μ) | Combustion time (second) |
| A | 41 | 35 | 0 | 80 | 74 | 0 | 82 | 77 | 0 |
| B | 41 | 35 | 7 | 80 | 74 | 6 | 82 | 77 | 6 |
| C | 47 | 40 | 8 | 83 | 76 | 6 | 84 | 79 | 6 |
| D | 47 | 40 | 0 | 83 | 76 | 0 | 84 | 79 | 0 |

TABLE 6

| Kind of mixed oil (Symbol in TABLE Table 2) | Capacitor element "I" | | | Capacitor element "II" | | | Capacitor element "III" | | |
|---|---|---|---|---|---|---|---|---|---|
| | CSV (V/μ) | ACL (V/μ) | Combustion time (second) | CSV (V/μ) | ACL (V/μ) | Combustion time (second) | CSV (V/μ) | ACL (V/μ) | Combustion time (second) |
| A | 42 | 34 | 0 | 79 | 74 | 0 | 82 | 77 | 0 |
| B | 42 | 34 | 8 | 79 | 73 | 7 | 82 | 77 | 8 |
| C | 47 | 41 | 8 | 84 | 77 | 7 | 85 | 79 | 7 |
| D | 47 | 41 | 0 | 84 | 77 | 0 | 84 | 79 | 0 |

TABLE 7

| Kind of mixed oil | Capacitor element "I" | | | Capacitor element "II" | | | Capacitor element "III" | | |
|---|---|---|---|---|---|---|---|---|---|
| (Symbol in TABLE 3) | CSV (V/μ) | ACL (V/μ) | Combustion time (second) | CSV (V/μ) | ACL (V/μ) | Combustion time (second) | CSV (V/μ) | ACL (V/μ) | Combustion time (second) |
| A | 41 | 33 | 0 | 79 | 73 | 0 | 83 | 76 | 0 |
| B | 41 | 33 | 7 | 79 | 73 | 8 | 82 | 76 | 7 |
| C | 47 | 40 | 9 | 85 | 79 | 7 | 85 | 79 | 7 |
| D | 47 | 39 | 0 | 85 | 79 | 0 | 85 | 79 | 0 |

TABLE 8

| Kind of mixed oil | Capacitor element "I" | | | Capacitor element "II" | | | Capacitor element "III" | | |
|---|---|---|---|---|---|---|---|---|---|
| (Symbol in TABLE 4) | CSV (V/μ) | ACL (V/μ) | Combustion time (second) | CSV (V/μ) | ACL (V/μ) | Combustion time (second) | CSV (V/μ) | ACL (V/μ) | Combustion time (second) |
| A | 42 | 33 | 0 | 79 | 74 | 0 | 83 | 77 | 0 |
| B | 42 | 34 | 8 | 79 | 74 | 8 | 82 | 76 | 5 |
| C | 48 | 40 | 7 | 83 | 76 | 9 | 86 | 80 | 7 |
| D | 47 | 40 | 0 | 83 | 77 | 0 | 85 | 80 | 0 |

In TABLES 1 to 4, the evaluation of the various mixed oils as the insulating oil for use in capacitors is based on the combustion time, tan δ, the penetrating amount and the evaporated amount. As can be seen from the evaluation, the mixed oils the amounts of the components of which fall within the hatched area in the ternary diagram of FIG. 1 are superior in all of the above-mentioned characteristics. The area is numerically defined as follows:

$50 \leq X \leq 80$
$5 \leq Y \leq 50$
$0 < Z \leq 15$

In the above and FIG. 1, X, Y and Z express triaryl phosphate, DIPN and MIPN, respectively, and the numerial values are in % by weight.

The criteria for the evalueation are given below:

| | Superior (O) | Inferior (X) |
|---|---|---|
| Combustion time (second) | $\leq 10$ | $> 10$ |
| tan δ (%) at 80° C. | $\leq 1$ | $> 1$ |
| Penetrating amount (g/m²/day) | $\geq 2$ | $< 2$ |
| Evaporated amount (%) at 95° C. 5 hrs. | $\leq 0.2$ | $> 0.2$ |

TABLES 5 to 8 show the characteristics of the capacitor elements I, II and III impregnated with the mixed oils A to D which are superior with respect to the above-mentioned characteristics. Thus it is possible to provide the capacitors which are incombustible and have high CSV and ACL. For comparison, the capacitors having the capacitor elements I, II and III treated in the above-mentioned manner and impregnated with conventional mineral oil have been tested. They are all combustible and have lower CSV and ACL values as shown below in Table 9.

TABLE 9

| Capacitor element | I | II | III |
|---|---|---|---|
| CSV (at 25° C.) (V/μ) | 35 | 42 | 30 |
| ACL (at 25° C.) (V/μ) | 25 | 35 | 21 |
| Combustion time (second) | >60 | >60 | >60 |

As above described in detail, the invention has successfully increased the CSV and ACL of capacitors in comparison with capacitors impregnated with conventional mineral oil and made them compact in size, incombustible and capable of withstanding higher voltages.

Having described preferred embodiments of the invention, there may be various changes and modifications thereof. For example, a stabilzer of the phenolic, amine, or epoxy type or a mixture thereof may be added to the mixed oil so as to catch those substances which have been produced by the electrical and/or thermal energy produced upon application of electricity to the mixed oil, the dielectric or the insulating material and which may well deteriorate the characteristics of the capacitor.

In the capacitor which employs at least one sheet of plastic film as the dielectric, it is possible to improve impregnation of the capacitor element with the mixed oil by applying heat or voltage or both heat and voltage to the capacitor for a period of time after completion of the oil impregnation process, or by roughening the surface of the plastic film and/or the electrode foils.

Although the dielectric loss tangent of the mixed oil used in the invention presents a slightly high value due to the inclusion of triaryl phosphate, the value can be reduced by treating the mixed oil with acid clay or ion-exchange resin or by electrophoresis as have been proposed by the present inventors.

What we claim is:

1. An electrical capacitor comprising a casing, a capacitor element in said casing and an insulating oil enclosed in said casing to impregnate said element, said oil comprising a mixture of: 50% to 80% by weight triaryl phosphate having the structural formula of

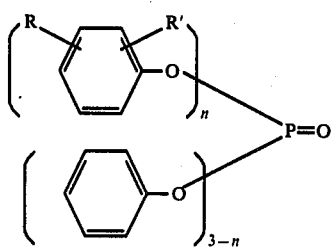

wherein N=1 to 3; R and R' are alkyl groups, the number of R groups attached to each benzene ring being 1 and the number of R' groups attached to each benzene ring being 0 or 1, and the total number of the carbon atoms contained in said alkyl groups attached to each benzene ring is 1 to 5; 5% to 50% by weight of a first insulating oil the principal component of which is diisopropyl naphthalene; and a second insulating oil in an amount greater than 0% by weight an up to 15% by weight, the principal component of said second insulating oil being monoispropyl naphthalene; the total of the amounts of said triaryl phosphate, said first insulating oil and said second insulating oil being 100% by weight.

2. The capacitor of claim 1, wherein said triaryl phosphate comprises tricresylphosphate.

3. The capacitor of claim 1, wherein the triaryl phosphate comprises triisopropylphenyl phosphate and phenyl-diisopropylphenyl phosphate.

4. The capacitor of claim 1, wherein said capacitor element includes at least one sheet of plastic film as the dielectric.

5. The capacitor of claim 1, wherein said capacitor element includes plastic film alone as the dielectric.

6. The capacitor of claim 4, wherein said plastic film is a member selected from the polyolefin group.

7. The capacitor of claim 6, wherein said plastic film is polypropylene film.

8. The capacitor of claim 7, wherein said polypropylene film is a biaxially oriented polypropylene film.

* * * * *